Patented June 19, 1951

2,557,524

UNITED STATES PATENT OFFICE 2,557,524

BAKERY SHORTENING COMPOSITION AND METHOD OF MAKING THE SAME

Ralph W. Wade, Indianapolis, Ind.

No Drawing. Application October 18, 1949, Serial No. 122,151

2 Claims. (Cl. 99—123)

This invention relates to a composition used as a substitute for a portion of the shortening in pastry and to a process for preparing said composition.

An important object of this invention is to provide an edible composition which is less expensive than the shortening normally used in pastry and which can be substituted for a portion of the shortening used in a pastry mix. This new composition can be used in any standard pastry recipe as a substitute for a portion of the shortening specified in the recipe without any other changes in the recipe. The composition, however, is more than a mere shortening substitute.

Other important objects of the invention are to provide a composition which when used as a substitute for a portion of the shortening in pastry mixes will improve and retain the flavor in the finished pastry; will improve the keeping qualities of the finished pastry; will retard mold formation on the finished pastry; will reduce the amount of fat and consequently the amount of calories in the finished pastry; will produce finished pastry products which are more easily removed from their pans; will produce finished pastry having a more tender crust; will produce finished pastry having a greater volume; will produce finished pastry having more uniform sizes and shapes; will make it possible to increase the liquid and sugar content of pastry mixes; will produce fermented doughs which are more pliable, easily worked, and have better sheeting qualities; and will act as a softening agent for doughs.

A still further important object of this invention is to produce a composition which when used in pastry mixes will impart the above desirable properties to the finished product and which consists entirely of edible substances.

In order that those skilled in the art may understand how the invention may be carried into effect, the following example is given by way of illustration and not by way of limitation.

| | Parts by weight |
|---|---|
| Water | 115 |
| Corn starch | 8 |
| Glucose | 8 |
| Corn oil | 16 |
| Propylene glycol | 5.3 |
| Monocalcium phosphate | 0.75 |

The above named ingredients are placed in a steam jacketed kettle and thoroughly mixed. The resulting mixture is then heated to a temperature of 202 degrees Fahrenheit and then cooled to a temperature of 80 degrees Fahrenheit.

The resulting product is a white gelatinous mass which is unstable and should be used within seventy-two hours of preparation, although it can be kept for longer periods of time if vacuum sealed and stored in a cool place.

This composition can be used as a substitute for up to as much as 20 per cent of the regular shortening in any pastry mix recipe, and may be used as a substitute for up to as much as 36 per cent of the regular shortening in certain pastry batter recipes such as cup cake mix and other products wherein fine texture is not necessary in the finished pastry.

The amount of the composition which can be used in any particular recipe depends upon the desired texture of the finished pastry, as the substitution of the composition for shortening results in finished pastry which has a coarser texture than pastry produced using only ordinary shortening.

The composition is preferably added to the other ingredients in any standard pastry recipe after all of the dry ingredients, the regular shortening, and approximately one quarter of the liquids specified in the recipe have been mixed, but before all of the liquids specified in the recipe have been added to the mixture.

The following devil's food cup cake recipe illustrates one recipe in which the bakery composition can be used. All parts are by weight.

| | |
|---|---|
| Cake flour | 100 |
| Superglycerinated shortening | 18.6 |
| Lard | 18.6 |
| Granulated sugar | 188 |
| Baking powder | 4 |
| Salt | 4 |
| Baking soda | 3 |
| Skim milk | 142 |
| Bakery shortening composition | 21 |
| Egg whites | 68.5 |
| Whole eggs | 9 |
| Vanilla flavor | 1 |

The lard, superglycerinated shortening, and 50 parts of the flour are first mixed together. Then the sugar, baking powder, salt, baking soda, 60 parts of skim milk, and the remaining 50 parts of flour are added and mixed. The bakery shortening composition is then added and mixed. Then the remaining 82 parts of skim milk, the egg whites, whole eggs, and the vanilla flavor are added and mixed. The cup cakes are then baked in the usual and known manner.

When used as a substitute for 36 per cent of the shortening in a cup cake recipe, as above set out, it is possible to increase the liquid and sugar content of the mix and incorporate 220 per cent liquids and 188 per cent sugar in the mix based on the weight of the flour.

The only purpose of the monocalcium phosphate in the bakery shortening composition is to adjust the pH of the mixture in the range from 5 to 7, and it may be replaced by a sufficient amount of any other edible pH controlling agent such as acetic or citric acid to adjust the pH of the composition in the range from 5 to 7.

The amounts of each of the ingredients in the bakery shortening composition as above set forth have been found to give a preferred composition, but it is possible to vary the amounts of each of the ingredients with decreased benefits of this invention.

It is also possible to substitute other forms of starch, such as flour, for part or all of the corn starch specified in the example, and to substitute other unsaturated glycerides, such as lard, for part or all of the corn oil specified in the example, but such changes are not recommended. It has been found that corn sugar is a convenient source of the glucose specified in the example.

In heating the mixture it has been found that temperatures from 180 to 220 degrees Fahrenheit will produce a satisfactory composition, but the temperature of 202 degrees Fahrenheit set out in the example is preferred.

I claim:

1. A shortening substitute comprising a mixture of approximately 115 parts by weight of water, approximately 8 parts by weight of corn starch, approximately 8 parts by weight of glucose, approximately 16 parts by weight of corn oil, approximately 5.3 parts by weight of propylene glycol, and an edible pH controlling agent in an amount such as to impart to said mixture a pH in the range from 5 to 7, which mixture has been heated to a temperature of approximately 202 degrees Fahrenheit and then cooled to a temperature of approximately 80 degrees Fahrenheit.

2. The process for preparing a shortening substitute which comprises mixing approximately 115 parts by weight of water, approximately 8 parts by weight of corn starch, approximately 8 parts by weight of glucose, approximately 16 parts by weight of corn oil, approximately 5.3 parts by weight of propylene glycol, and an edible pH controlling agent in an amount such as to impart to said mixture a pH in the range from 5 to 7, heating said mixture to a temperature of approximately 202 degrees Fahrenheit; and then cooling the mixture to a temperature of approximately 80 degrees Fahrenheit.

RALPH W. WADE.

REFERENCES CITED

The following references are of record in the file of this patent:

UNITED STATES PATENTS

| Number | Name | Date |
|---|---|---|
| 1,113,632 | Holbrook | Oct. 13, 1914 |
| 2,131,064 | Musher | Sept. 27, 1938 |
| 2,167,144 | Barton et al. | July 25, 1939 |
| 2,220,976 | Schou | Nov. 12, 1940 |